US012556771B1

(12) United States Patent
Thompson

(10) Patent No.: US 12,556,771 B1
(45) Date of Patent: Feb. 17, 2026

(54) VIDEO SYSTEM WITH INTRA-VIDEO USER INPUT AND RELATED METHODS

(71) Applicant: Spincast, Inc., Goldenrod, FL (US)

(72) Inventor: Daniel H. Thompson, Goldenrod, FL (US)

(73) Assignee: SPINCAST, INC., Orlando, FL (US)

( * ) Notice: Subject to any disclaimer, the term of this patent is extended or adjusted under 35 U.S.C. 154(b) by 58 days.

(21) Appl. No.: 18/749,551

(22) Filed: Jun. 20, 2024

Related U.S. Application Data

(60) Provisional application No. 63/513,096, filed on Jul. 11, 2023.

(51) Int. Cl.
*H04N 21/478* (2011.01)
*H04N 21/234* (2011.01)
*H04N 21/81* (2011.01)
*H04N 21/845* (2011.01)
*H04N 21/858* (2011.01)

(52) U.S. Cl.
CPC . *H04N 21/47815* (2013.01); *H04N 21/23418* (2013.01); *H04N 21/812* (2013.01); *H04N 21/845* (2013.01); *H04N 21/858* (2013.01)

(58) Field of Classification Search
CPC ................................................ H04N 21/47815
See application file for complete search history.

(56) References Cited

U.S. PATENT DOCUMENTS

| | | |
|---|---|---|
| 3,261,019 A | 7/1966 | Lundy |
| 5,838,314 A | 11/1998 | Neel et al. |
| 6,760,916 B2 | 7/2004 | Holtz et al. |
| 6,832,070 B1 | 12/2004 | Perry et al. |
| 6,898,762 B2 | 5/2005 | Ellis et al. |
| 6,990,498 B2 | 1/2006 | Fenton et al. |
| 7,039,688 B2 | 5/2006 | Matsuda et al. |
| 7,996,864 B2 | 8/2011 | Yuen et al. |
| 8,103,793 B2 | 1/2012 | Heller et al. |
| 8,146,126 B2 | 3/2012 | Downey et al. |
| 8,356,251 B2 | 1/2013 | Strober |
| 8,433,696 B2 | 4/2013 | Venkataraman et al. |

(Continued)

OTHER PUBLICATIONS

Nielsen "ID3 Tag Validator Application" https://www.manualslib.com/manual/2428567/ Nielsen-Id3.html 2017; pp. 67.

(Continued)

*Primary Examiner* — Michael H Hong
(74) *Attorney, Agent, or Firm* — Allen, Dyer, Doppelt + Gilchrist, PA

(57) ABSTRACT

A wireless communications device in communication with a server and configured to render a video playback GUI for a video file. The video playback GUI may include a video rendering window, and a user input GUI element associated with the video rendering window. The wireless communications device may be configured to when the user input GUI element is activated while the video file is playing, send a unique identifier of the video file, and a time stamp for when the user input GUI element is activated to the server. The server may be configured to segment a video frame from the video file temporally adjacent to the time stamp for when the user input GUI element is activated, and generate metadata for the video frame, and transmit the metadata for the video frame to the wireless communications device.

23 Claims, 13 Drawing Sheets

(56) References Cited

U.S. PATENT DOCUMENTS

| | | | |
|---|---|---|---|
| 8,533,753 | B2 | 9/2013 | Briggs et al. |
| 8,768,781 | B2 | 7/2014 | McDevitt et al. |
| 8,782,528 | B2 | 7/2014 | Strober |
| 9,712,788 | B2 | 7/2017 | Downey et al. |
| 10,291,947 | B2 | 5/2019 | Bhatia et al. |
| 10,681,420 | B2 | 6/2020 | Kay et al. |
| 10,721,511 | B2 | 7/2020 | Madriz Ottolina et al. |
| 11,032,626 | B2 | 6/2021 | Fairbanks |
| 11,373,685 | B2 * | 6/2022 | Sun ............... H04N 21/234309 |
| 11,721,203 | B2 | 8/2023 | Huang et al. |
| 2008/0010119 | A1 | 1/2008 | Oliveira et al. |
| 2010/0023579 | A1 * | 1/2010 | Chapweske ............... H04L 9/40 |
| | | | 709/203 |
| 2010/0169459 | A1 | 7/2010 | Biderman et al. |
| 2011/0082735 | A1 | 4/2011 | Kannan et al. |
| 2012/0053965 | A1 | 3/2012 | Hellman et al. |
| 2012/0167146 | A1 | 6/2012 | Incorvia |
| 2012/0233036 | A1 | 9/2012 | Mirashrafi et al. |
| 2012/0246685 | A1 | 9/2012 | Fink et al. |
| 2013/0282526 | A1 | 10/2013 | Cummins et al. |
| 2015/0347415 | A1 | 12/2015 | Pantos et al. |
| 2019/0362154 | A1 | 11/2019 | Moore et al. |
| 2022/0167067 | A1 | 5/2022 | Fairbanks |
| 2023/0077795 | A1 * | 3/2023 | Sivaswamy ........ G06Q 30/0255 |
| | | | 725/34 |

OTHER PUBLICATIONS

Sharon Edelson "Shopsense AI Brings Live Shopping To A Variety Of Shows" https://www.forbes.com/sites/sharonedelson/2024/04/16/shopsense-ai-brings-live-shopping-to-a-variety-of-television-shows/?sh=2a1a666a79e2 Apr. 16, 2024, pp. 2.

Telestream "Vantage Application Note—Using Nielsen Watermarking with Vantage" https://primary.telestream.net/pdfs/app-notes/app_Vantage_Nielsen.pdf Aug. 2020; pp. 28.

Dan Meier "How Shopsense AI is Aiming to Take Shoppable TV Beyond the QRCode" https://videoweek.com/2024/05/23/how-shopsense-ai-is-aiming-to-take-shoppable-tv-beyond-the-qr-code/ May 23, 2024 pp. 2.

Xanayra Marin-Lopez "Shopsense launches retailmedia platform for second-screen shopping" Retail Dive: https://www.retaildive.com/news/shopsense-paramount-launch-retail-media-network-ai/712770/ May 9, 2024; pp. 2.

Zhai et al. "Visual Discovery at Pinterest" International World Wide Web Conference Committee (IW3C2), published under Creative Commons CC BY 4.0 License. Apr. 2017 pp. 10.

Nielsen "VOD Content Encoder" https://nielsendownloads-blue.digitalengsdk.com/tv/Encoding/VOD+Content+Encoder/VOD_Content_Encoder_User_Manual_6.pdf Release 6.0 Revision J Mar. 19, 2020; pp. 82.

Advanced Television Systems Committee, Inc. "ATSC Recommended Practice: Design Of Multiple Transmitter Networks" Document A/111:2009, Sep. 18, 2009 pp. 138.

Michael Koch "An Introduction to FFmpeg, DaVinci Resolve, Timelapse and Fulldome Video Production, Special Effects, Color Grading, Streaming, Audio Processing, Canon 5D-MK4, Panasonic Lumix GH5S, Kodak Pixpro SP360 4K, Ricoh Theta V, Synthesizers, Image Processing and Astronomy Software" http://www.astro-electronic.de/FFmpeg_Book.pdf Jun. 22, 2021 pp. 562.

Advanced Television Systems Committee, Inc. "Call for Proposals For ATSC-3.0 Automatic Content Recognition Watermarking Solutions ATSC Technology Group 3 (ATSC 3.0)" S33 Doc. 067r3 https://www.atsc.org.

Google "Video action campaigns" https://support.google.com/google-ads/answer/10147229 Retrieved from internet Aug. 26, 2024; pp. 10.

Hassan et al. "Demonstrating shoppable TV for monetization in sports" https://aws.amazon.com/blogs/media/demonstrating-shoppable-tv-for-monetization-in-sports/ AWS for M&E Blog; Sep. 7, 2022; pp. 7.

Aisha Malik "Amazon™ s TikTok-like Inspire shopping feed is now available to all customers in the US" https://techcrunch.com/202305/05/amazons-tiktok-like-inspire-shopping-feed-available-all-customers-us/ May 5, 2023; pp. 3.

Macher et al. "Multiprogram Transport Stream: Management and Switching Solutions" SMPTE Motion Imaging: Apr. 2003; www.smpte.org pp. 7.

Hiawatha Bray "Internet pop-up ads come to SmartTV" https://www.bostonglobe.com/business/2014/12/11/internet-pop-ads-come-smarttv/gzWRjOVv1t4gHjmwluA6PP/story.html Dec. 11, 2014; pp. 3.

Amanda C. Thompson "Shoppable TV Made Better with Sodyo" https://www.sodyo.com/blog/shoppable-tv-made-better-with-sodyo ; Jan. 21, 2020 pp. 3.

Pablo Suarez "Can™ t Wait for the Ads? Tune in to Shoppable TV" Maryland Today; https://today.umd.edu/cant-wait-for-the-ads-tune-in-to-shoppable-tv Nov. 29, 2021; pp. 4.

Harrison Bennett "ITV to launch shoppable TV during Love Island" https://rts.org.uk/article/itv-launch-shoppable-tv-during-love-island Jul. 6, 2021; pp. 6.

Isabel Greenfield "Connected TV is Shoppable TV" https://mountain.com/blog/ctv-shoppable-ads/ Retrieved froom internet Aug. 26, 2024 pp. 4.

Delia Mitchell "Shoppable Entertainment Platform NOWwith Features Celebrities and Their Must-Haves" Cew Daily: https://cew.org/beauty_news/shoppable-entertainment-platform-nowwith-features-celebrities-and-their-must-haves/ Jun. 28, 2021; pp. 4.

Netflix "DIAL Discovery And Launch protocol specification Version 2.2.1" https://www.scribd.com/document/726607866/DIAL-2ndScreenProtocol-2-2-1: 2021; pp. 40.

* cited by examiner

Description

Default Ads

Target Brand App

Legacy: Spincast TV

Targeting Type

Geographic

Country

United States

Region

Florida, United States

City

Winter Springs, Florida, US

Call to Action Type

VideoButton

VIDEO SYSTEM WITH INTRA-VIDEO USER INPUT AND RELATED METHODS

RELATED APPLICATION

This application is based upon prior filed copending Application No. 63/513,096 filed Jul. 11, 2023, the entire subject matter of which is incorporated herein by reference in its entirety.

TECHNICAL FIELD

The present disclosure relates to the field of digital media consumption, and, more particularly, to a system for video playback and related methods.

BACKGROUND

Digital media consumption has become ubiquitous in modern society. As with its analog predecessor, digital media routinely includes advertisements. One drawback to advertisements in digital media is the out of band experience for conversion. For instance, if the user views an advertisement on a television device, the user must seek the source of the ad on another device (i.e., advertisement conversion), such as a personal computer or mobile computing device. Even with enhancements such as embedded quick response (QR) codes, for conversion, the user is still forced to go to another device. In fact, when the user is viewing the digital media on the mobile computing device, the conversion of the user via the advertisement either interrupts and/or takes the user away from the digital media, which is less than desirable for user experience.

SUMMARY

Generally, a video system may comprise a server configured to store a plurality of video files and at least one wireless communications device in communication with the server. The at least one wireless communications device may be configured to render a video playback graphical user interface (GUI) for at least one video file from the plurality of video files. The video playback GUI may include a video rendering window, and a user input GUI element associated with the video rendering window. The at least one wireless communications device may be configured to when the user input GUI element is activated while the at least one video file is playing, send a unique identifier of the at least one video file, and a time stamp for when the user input GUI element is activated to the server. The server may be configured to segment a video frame from the at least one video file temporally adjacent to the time stamp for when the user input GUI element is activated, generate metadata for the video frame, the metadata being associated with a commercial source for at least one item in the video frame, and store the metadata along with the video frame, the unique identifier of the at least one video file, and the time stamp. The server may be configured to transmit the metadata for the video frame to the at least one wireless communications device.

In particular, the server may be configured to segment a plurality of video frames from the at least one video file within a time period of the time stamp, and determine a subset of video frames based upon a vision difference process. The server may be configured to generate the metadata by performing a vision recognition process on the video frame from the at least one video file. In some embodiments, the server may be configured to generate the metadata based upon a plurality of image object classes, and at least one of the plurality of image object classes may have a respective priority commercial source for a respective image class.

Also, the server may be configured to determine a plurality of advertisements within the at least one video file, and generate inline advertisement metadata for the plurality of advertisements. The server may be configured to transmit the inline advertisement metadata to the at least one wireless communications device, and the at least one wireless communications device may be configured to render an inline advertisement GUI comprising a chronological listing of the inline advertisement metadata for the plurality of advertisements within the at least one video file. The at least one wireless communications device may be configured to maintain the inline advertisement metadata for the plurality of advertisements within the at least one video file for a set time period.

For example, the metadata may comprise at least one of a link to purchase the at least one item in the video frame from the commercial source, and a coupon for the at least one item in the video frame. The at least one wireless communications device may comprise a first mobile wireless communications device and a second TV wireless communications device in communication with the first mobile wireless communications device. The second TV wireless communications device may be configured to render the video playback GUI, and the first mobile wireless communications device may be configured to render the user input GUI element. Further, the at least one wireless communications device may be configured to store activations of the user input GUI element for the at least one video file, and the at least one wireless communications device may be configured to render a favorites GUI for viewing the activations of the user input GUI element for the at least one video file.

Another aspect is directed to a server in a video system. The video system may include at least one wireless communications device in communication with the server and configured to render a video playback GUI for at least one video file from a plurality of video files, the video playback GUI comprising a video rendering window, and a user input GUI element associated the video rendering window. The at least one wireless communications device may be configured to when the user input GUI element is activated while the at least one video file is playing, send a unique identifier of the at least one video file, and a time stamp for when the user input GUI element is activated to the server. The server may include a processor and memory coupled thereto configured to segment a video frame from the at least one video file temporally adjacent to the time stamp for when the user input GUI element is activated, and generate metadata for the video frame, the metadata being associated with a commercial source for at least one item in the video frame. The processor may be configured to store the metadata along with the video frame, the unique identifier of the at least one video file, and the time stamp, and transmit the metadata for the video frame to the at least one wireless communications device.

Another aspect is directed to a method of operating a server in a video system. The server may be configured to store a plurality of video files. The video system may include at least one wireless communications device in communication with the server and configured to render a video playback GUI for at least one video file from the plurality of video files. The video playback GUI may include a video rendering window, and a user input GUI element associated with the video rendering window. The at least one wireless communications device may be configured to when the user input GUI element is activated while the at least one video file is playing, send a unique identifier of the at least one video file, and a time stamp for when the user input GUI element is activated to the server. The method may include operating the server to segment a video frame from the at least one video file temporally adjacent to the time stamp for when the user input GUI element is activated, and operating the server to generate metadata for the video frame, the metadata being associated with a commercial source for at least one item in the video frame. The method may also include operating the server to store the metadata along with the video frame, the unique identifier of the at least one video file, and the time stamp, and operating the server to transmit the metadata for the video frame to the at least one wireless communications device.

BRIEF DESCRIPTION OF THE DRAWINGS

FIG. 3 is a snippet of code from the video system of FIG. 1.
FIGS. 5A-5D are screenshots of an example embodiment of a GUI for the wireless communications device in the video system of FIG. 4.

DETAILED DESCRIPTION

Figure 1:
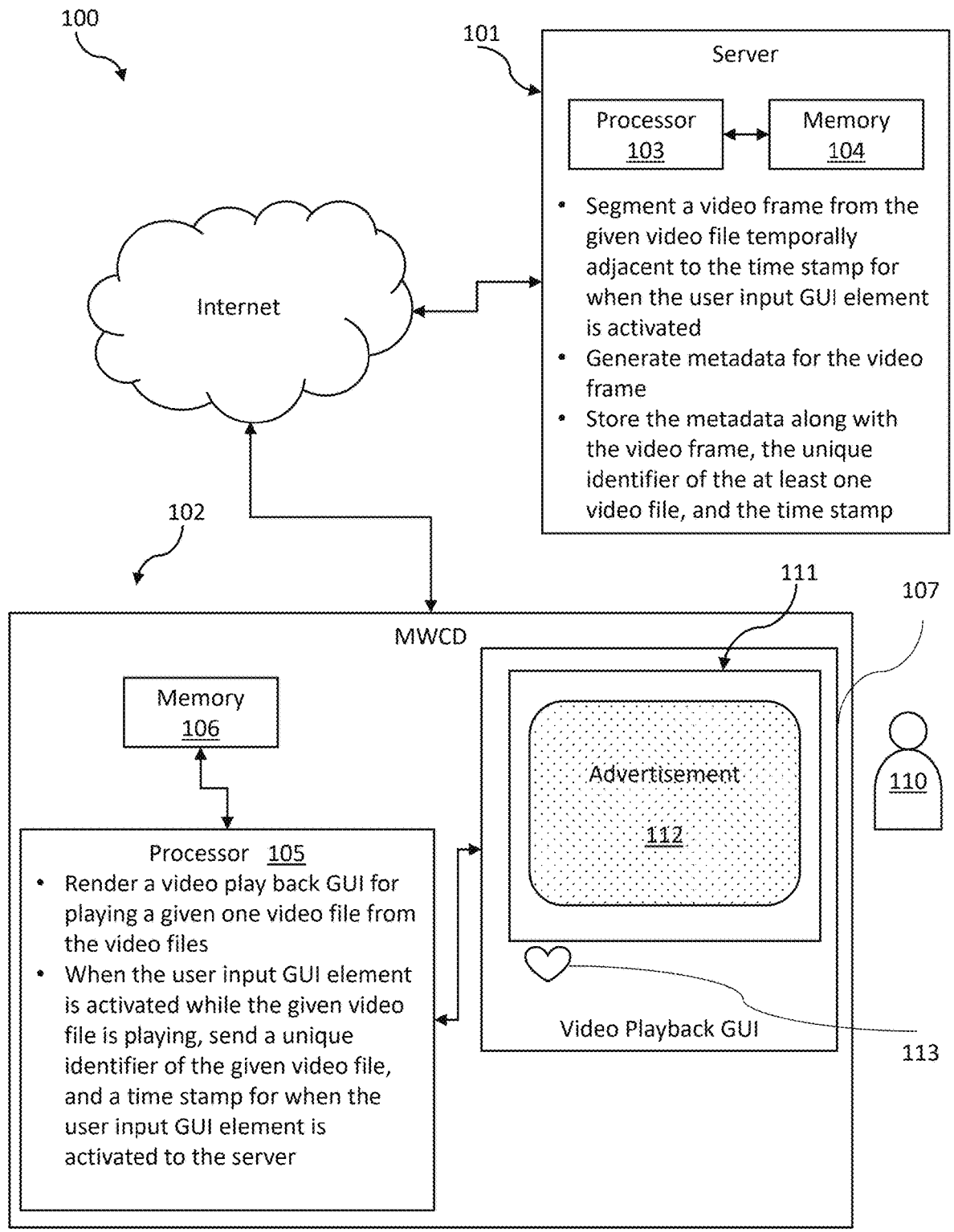
FIG. 1 is a schematic diagram of a first example embodiment of a video system, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIG. 1, a video system 100 according to the present disclosure is now described. The video system 100 illustratively includes a server 101 configured to store a plurality of video files, and a mobile wireless communications device 102 in communication with the server. The server 101 comprises a processor 103, and a memory 104 coupled thereto. Although the server 101 is depicted as a single unit for illustrative clarity, it should be appreciated that the server may comprise one or more computing devices, and/or resources from a cloud computing platform (e.g., Amazon AWS).

It should be appreciated that the video system 100 may comprise a plurality of mobile wireless communications device with respective users, but for drawing clarity, only the single mobile wireless communications device 102 is shown. The mobile wireless communications device 102 illustratively comprises a processor 105, a memory 106 coupled thereto, and a display 107 (e.g., touchscreen) coupled to the processor. Of course, there is a user 110 associated with the mobile wireless communications device 102. The mobile wireless communications device 102 may comprise one or more of the following computing devices, for example, a desktop computing device, a personal computing device, a mobile cellular device, a tablet computing device, or a smart TV device. Moreover, the teachings herein may be applied to a mobile cellular device paired with a smart TV device, for example, via the Chromecast protocol or the Airplay protocol.

The server 101 may be configured to import the plurality of video files. Of course, the server 101 may be configured to provide a content generation function and permit some or all of the plurality of video files to be generated natively (i.e., a combination of native and imported video files). In some embodiments, one or more of the video files may be generated from a live streamed event, which is recorded by the server 101. The server 101 is configured to generate one or more of a unique identifier for each video file, a run time for each video file, a unique identifier for a respective user, and a device or channel unique identifier for each video file. In other words, the server 101 is configured to generate metadata for each video file. The plurality of video files and the associated metadata may be stored within a database within the memory 104 or separately from the server 101.

In some embodiments, the server 101 may create one or more playlists for the user 110. Each playlist may comprise a subset of the plurality of video files in an ordered sequence. The server 101 may also provide an interface for user created playlists. For example, in some embodiments, each playlist may comprise an HTTP Live Streaming (HLS) manifest having the unique identifier for each of the included video files, the time duration of each of the included video files, and a total time duration for all of the included video files. Other playlist formats may be used, such as the DASH streaming and playlists protocol, for example. Also, in some embodiments, in addition or in alternative to the HLS manifest, the unique identifier for each of the included video files, the time duration of each of the included video files, and the total time duration for all of the included video file may be included within metadata each of the plurality of video files, for example, within an ID3 tag module or within the A/76 ATSC Programming Metadata Communication Protocol Standard. In another embodiment, this information may be passed from the server 101 to the mobile wireless communications device 102 via a data and object carousel.

The mobile wireless communications device 102 is configured to render a video playback GUI 111 for playing at least one video file from the plurality of video files. The video playback GUI 111 illustratively comprises a video rendering window 112 (i.e., the window for rendering the at least one video file), and a user input GUI element 113 adjacent the video rendering window. The user input GUI element 113 may comprise a like button GUI element in some embodiments, or the heart button in illustrated embodiment. The user input GUI element 113 presents an input for the user 110 to indicate a desire to purchase (i.e., shop/like an item being depicted) the something depicted in a current playing at least one video file. It should be appreciated that the activation of the user input GUI element 113 can be associated with one or more of: a product being depicted currently in the at least one video file (i.e., a product in the field of view of the rendered image), an overlaid advertisement being depicted currently in the at least one video file, or an inline advertisement being depicted currently in the at least one video file.

In some embodiments, the mobile wireless communications device 102 is configured to when the user input GUI element 113 is activated while the at least one video file is playing, segment at least one video frame from the at least one video file temporally adjacent to a time stamp for when the user input GUI element is activated. In particular, the mobile wireless communications device 102 is configured to extract the at least one video frame from the at least one video file near contemporaneously (i.e., ±10 seconds or less, e.g.) from the activation of the user input GUI element 113, a unique identifier of the at least one video file, and a time stamp of the activation of the user input GUI element 113.

In other embodiments, the mobile wireless communications device 102 is configured to when the user input GUI element 113 is activated while the at least one video file is playing, send the unique identifier of the at least one video file, and the time stamp of the activation of the user input GUI element 113 to the server 101. Here, the server 101 is configured to segment the at least one video frame from the at least one video file temporally adjacent to the time stamp. Helpfully, the processor intensive image extraction is shifted to the server 101.

In some embodiments, the mobile wireless communications device 102 or the server 101 is configured to segment a plurality of video frames from the at least one video file temporally adjacent to the time stamp for when the user input GUI element is activated. In particular, the first video frame may be a set time period (e.g., 10 seconds) prior to the time stamp of the activation of the user input GUI element 113, thereby building in some anticipated lag from the user 110. The additional video frames can be selected based upon a difference calculation between adjacent video frames.

The mobile wireless communications device 102 is configured to send the at least one video frame (in embodiments where the segmenting is performed locally), the unique identifier of the at least one video file, and the time stamp to the server 101. This combination of data may be described as a shopped occurrence dataset for the user 110. Of course, in other embodiments, this shopped occurrence dataset may be sent to a separate database, and the server 101 may subsequently access the shopped occurrence dataset. This shopped occurrence dataset is stored and is associated with the user 110. As the user 110 activates the user input GUI element 113 over time, the database would include a plurality of shopped occurrence datasets associated with the user 110.

The server 101 is configured to generate metadata for the at least one video frame. In some embodiments, the server 101 is configured to perform image recognition processes on the at least one video frame, for example, optical character recognition. In some embodiments, the server 101 may cooperate with one or more third party server/service to process the at least one video frame. Once the metadata is received, the server 101 is configured to store the metadata along with the respective shopped occurrence dataset. For example, the metadata may comprise internet URL/links to the items shopped/liked. In some embodiments, the server 101 may be configured to modify the URL/links to include affiliate identifiers.

Figure 2A:
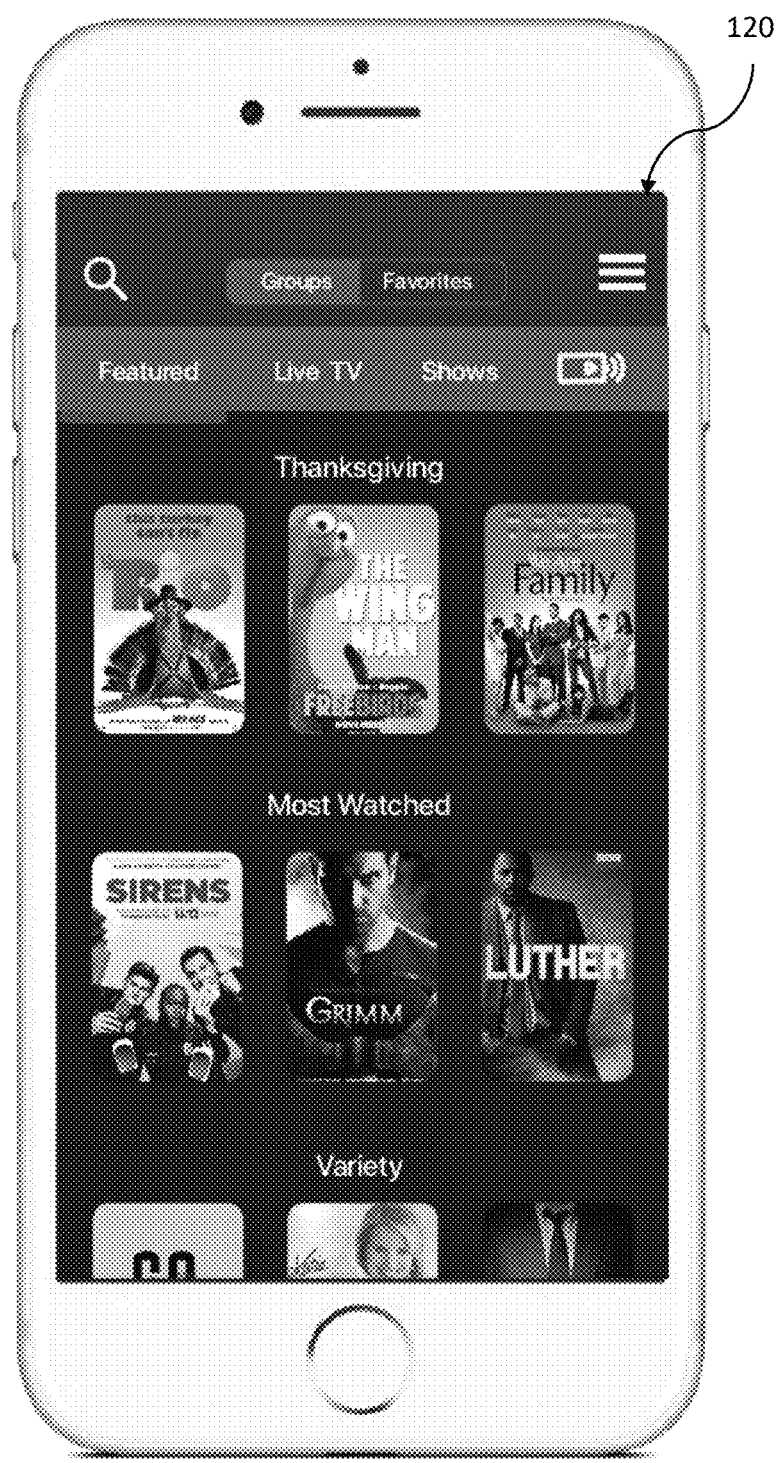
FIGS. 2A-2D are screenshots of an example embodiment of a GUI for the mobile wireless communications device in the video system of FIG. 1
Figure 2B:

Referring now additionally to FIGS. 2A-2D, the GUI for the mobile wireless communications device 102 is now described. FIG. 2A shows a content browsing GUI 120. The content browsing GUI 120 illustratively comprises a plurality of video listings for the corresponding plurality of video files within the server 101. FIG. 2B shows the video playback GUI 111. The video playback GUI 111 illustratively includes playback control inputs 121a-121b, and a slider bar 122. Here, the user input GUI element 113 is activated for the image within the video rendering window 112, which shows something the user 110 wishes to buy.

Figure 2C:
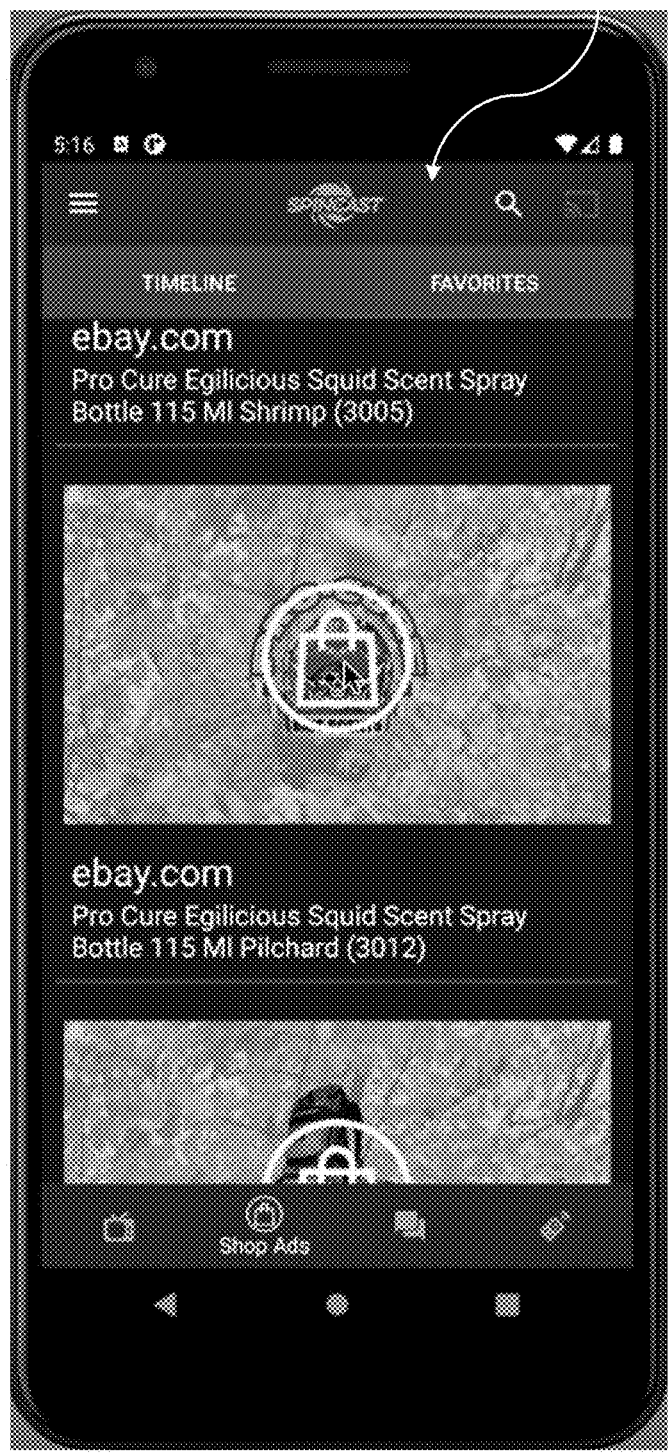
Figure 2D:
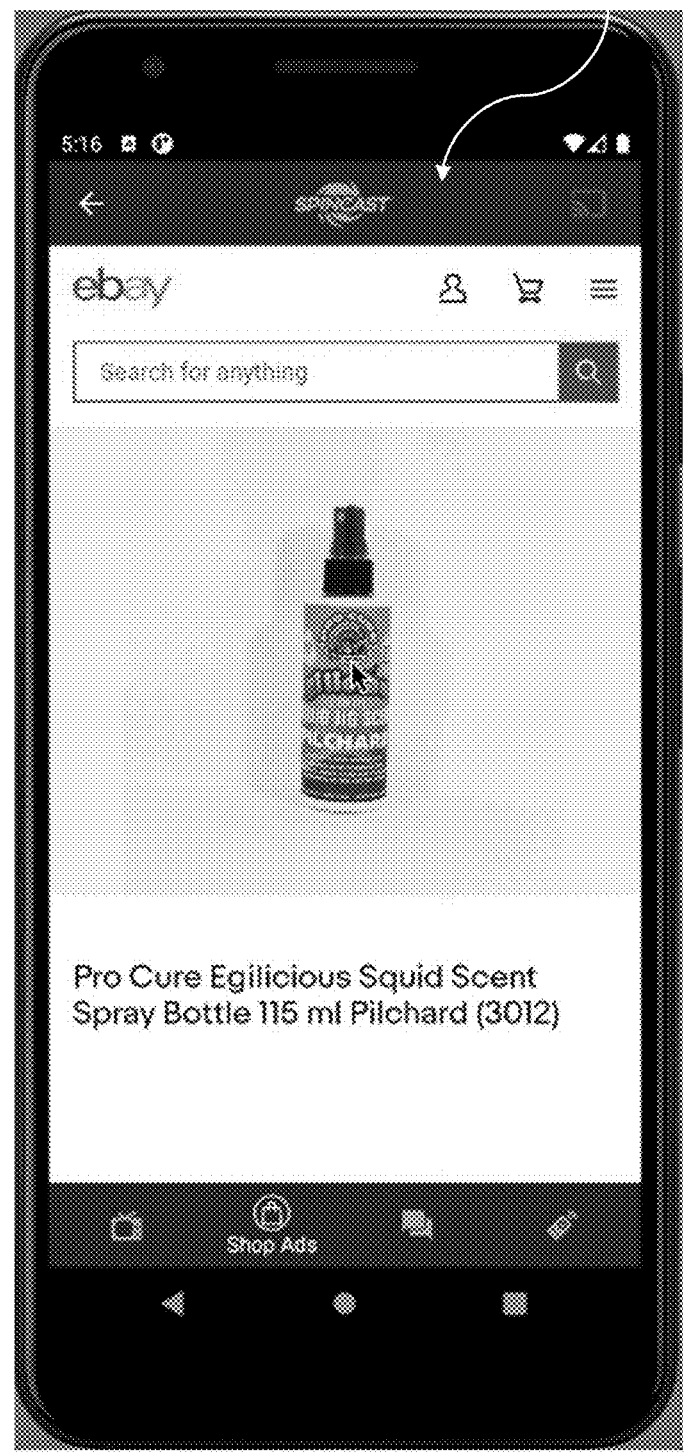

FIGS. 2C-2D shows the shopped occurrence GUI 123. Here, the user 110 may access the plurality of shopped occurrence datasets. Each shopped occurrence listing comprises the shopped occurrence dataset for the item of interest. For example, as shown in FIG. 2D, the shopped occurrence listing provides a hyperlink to the product for purchase and a name of the vendor selling the product for purchase.

In another embodiment, the teachings of the video system 100 may be applied to a plurality of audio files. In this embodiment, rather than a video frame being mined for metadata, a short audio clip is processed for metadata, for example, using a Shazam Voice Recognition.

Advantageously, the video system 100 may permit the user 110 to view advertisements asynchronously. That is, rather than being forced to click on the advertisements and disrupt viewing, which reduces the user's overall experience, the video system 100 permits the user to shop for products within the content, and view them after the fact. Further, the user 110 may shop/like normal advertisements within a given video file or simply a product shown organically within the given video file.

Referring now to FIG. 3, a screenshot 1000 shows a snippet of code from the server 101 making application programming interface calls to generate the metadata.

Another aspect is directed to a method for operating a video system 100 having a server 101 configured to store a plurality of video files, and at least one mobile wireless communications device 102 in communication with the server. The method includes operating the at least one mobile wireless communications device 102 to render a video playback GUI 111 for playing at least one video file from the plurality of video files. The video playback GUI 111 comprises a video rendering window 112, and a user input GUI element 113 adjacent the video rendering window. The method includes operating the at least one mobile wireless communications device to when the user input GUI element 113 is activated while the at least one video file is playing, segment a video frame from the at least one video file temporally adjacent to a time stamp for when the user input GUI element is activated, and send the video frame, a unique identifier of the at least one video file, and the time stamp to the server 101. The method includes operating the server 101 to generate metadata for the video frame, and store the metadata along with the video frame, the unique identifier of the at least one video file, and the time stamp.

Figure 4:
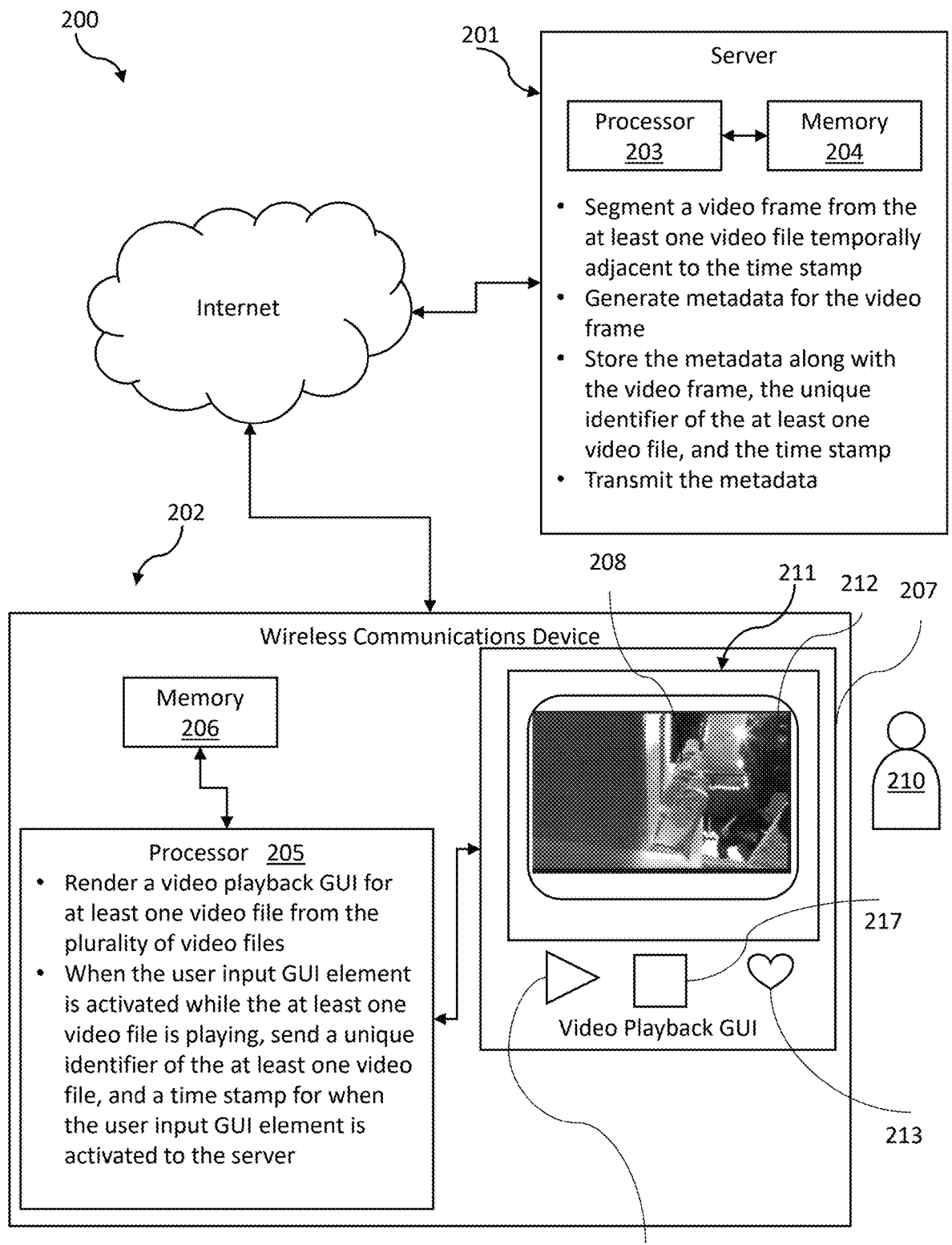
FIG. 4 is a schematic diagram of a second example embodiment of a video system, according to the present disclosure.
Figure 5A:
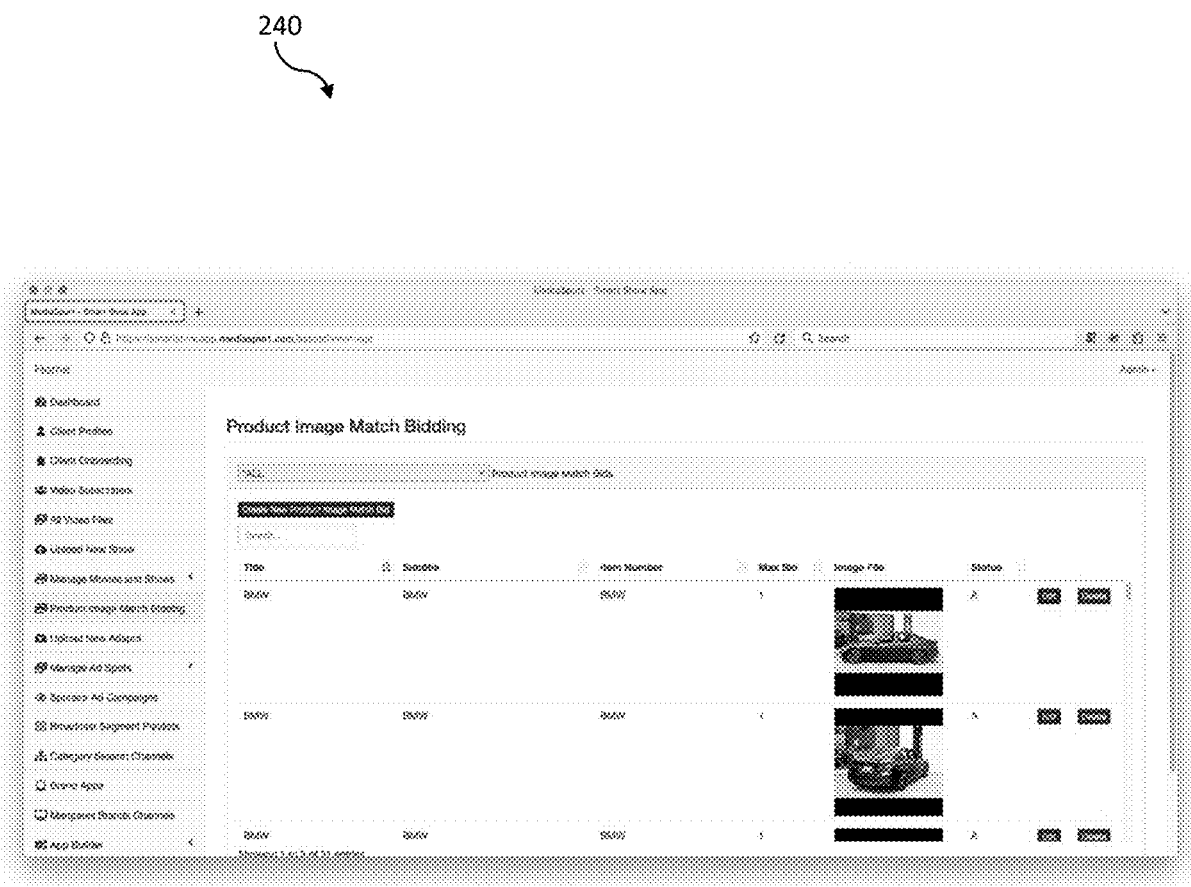
Figure 5B:
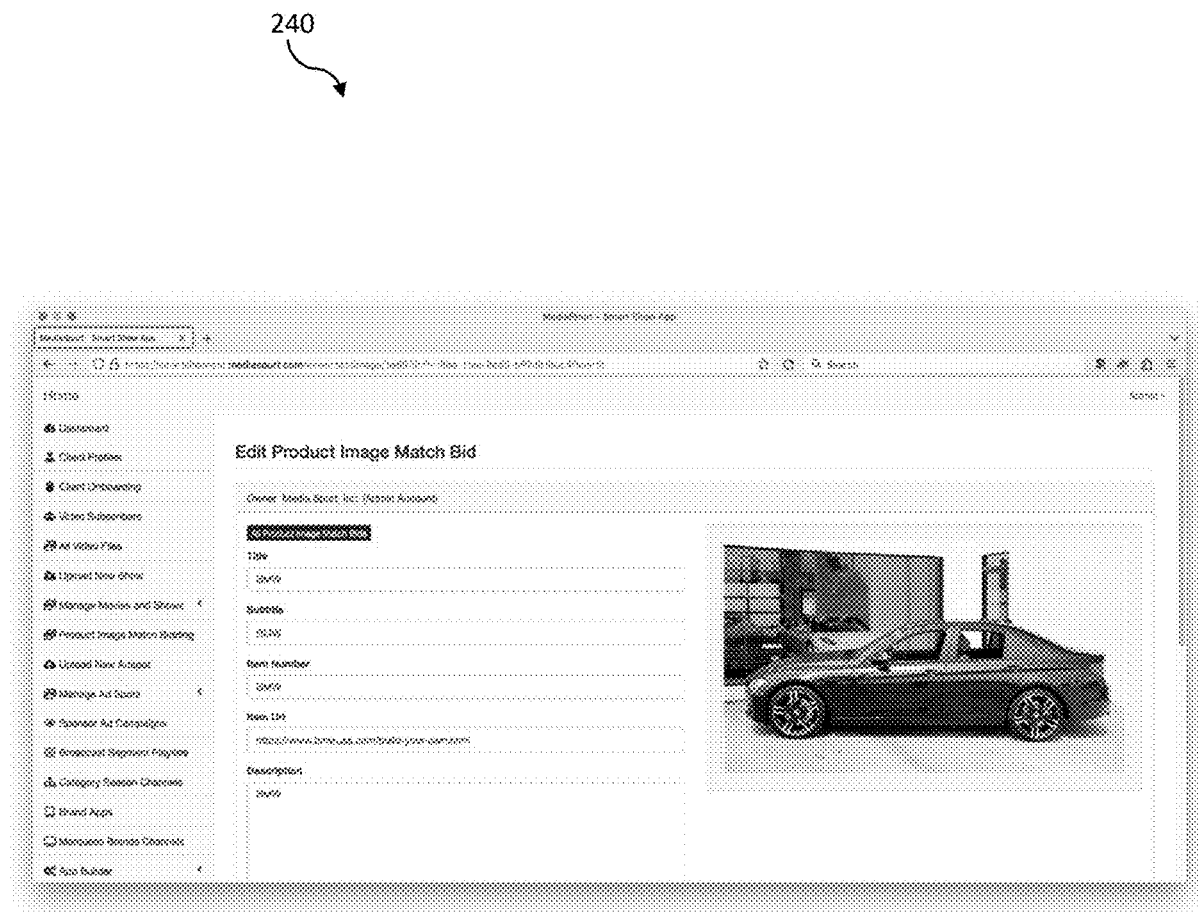
Figure 5D:
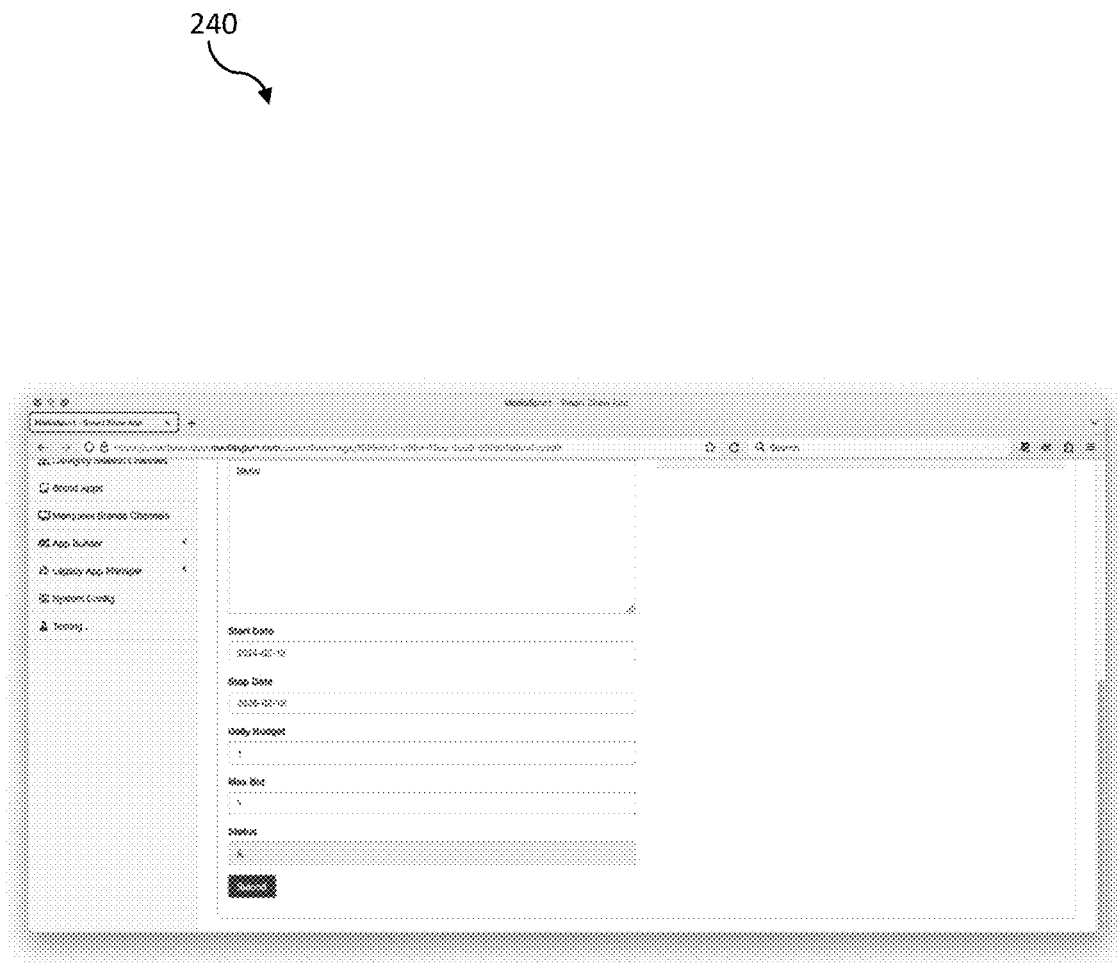

Referring now to FIGS. 4-5D, a video system 200 according to the present disclosure is now described. The video system 200 illustratively includes a server 201 configured to store a plurality of video files and a wireless communications device 202 in communication with the server. The server 201 comprises a processor 203, and a memory 204 coupled thereto. Although the server 201 is depicted as a single unit for illustrative clarity, it should be appreciated that the server may comprise one or more computing devices, and/or resources from a cloud computing platform (e.g., Amazon AWS).

It should be appreciated that the video system 200 may comprise a plurality of wireless communications device with respective users, but for drawing clarity, only the single wireless communications device 202 is shown. The wireless communications device 202 illustratively comprises a processor 205, a memory 206 coupled thereto, and a display 207 (e.g., touchscreen) coupled to the processor. Of course, there is a user 210 associated with the wireless communications device 202. The wireless communications device 202 may comprise one or more of the following computing devices, for example, a desktop computing device, a personal computing device, a mobile cellular device, a tablet computing device, or a smart TV device.

The wireless communications device 202 is configured to render a video playback GUI 211 on the display 207 and for at least one video file from the plurality of video files. It should be appreciated that the wireless communications device 202 may comprise one or more cooperating devices. For example, the teachings herein may be applied to a mobile device paired with a smart TV device, for example, via the Chromecast protocol or the Airplay protocol, such as the embodiment depicted in FIGS. 6-7.

The video playback GUI 211 illustratively comprises a video rendering window 212, a user input GUI element 213 associated the video rendering window, a play input GUI element 216, and a stop input GUI element 217. The user input GUI element 213 illustratively comprises a favorite icon, but this is merely exemplary. In other embodiments, the user input GUI element 213 may comprise a "buy what you see" toggle button.

The wireless communications device 202 is configured to when the user input GUI element 213 is activated while the at least one video file is playing, send a unique identifier of the at least one video file, and a time stamp for when the user input GUI element is activated to the server 201. It should be appreciated that the time stamp relates to a time position of play within the at least one video file. Helpfully, since the wireless communications device 202 sends only the unique identifier of the at least one video file and the time stamp, consumption of bandwidth and computational resources is reduced.

In some embodiments, the unique identifier may be embedded within metadata (e.g., ID3 tag) of the at least one video file. In other embodiments, as described hereinabove with other embodiments, the unique identifier may be contained within an HLS manifest. In yet other embodiments, the unique identifier may be embedded within the image data of the at least one video file, which is machine readable by the wireless communications device 202. For example, the embedded image data may comprise a QR code invisible to the user 210 or other visual watermark. In yet additional embodiments, the unique identifier may be embedded within the audio data of the at least one video file, which is machine readable by the wireless communications device 202. For example, the embedded audio data may comprise an audio encoded transmission inaudible to the user 210 or another audio watermark. In some embodiments, the wireless communications device 202 may share the metadata with nearby wireless devices.

With the unique identifier of the at least one video file and the time stamp, the server 201 is configured to segment a video frame (i.e., a still image frame) from the at least one video file temporally adjacent to the time stamp for when the user input GUI element 213 is activated. Optionally, the time stamp may be adjusted to compensate for lag due to reaction time of the user 210 and streaming related delay. In some embodiments, the server 201 may be configured to segment a plurality of video frames from the at least one video file within a time period of the time stamp (i.e., time windowing centered about the time stamp), and determine a subset of video frames based upon a vision difference process. As will be appreciated, the vision difference process would generate the subset of video frames to comprise sufficiently unique video frames. Helpfully, this may reduce the number of video frames processed downstream.

The server 201 is configured to process the video frame or the subset of video frames, and determine the presence of one or more items 208 therein, for example, the illustrated product bottles. In other words, the server 201 is configured to perform object recognition processes on the video frame or the subset of video frames to determine the presence of one or more items 208 therein.

The server 201 is configured to generate metadata for the video frame or the subset of video frames. The metadata is associated with a commercial source for the one or more items 208 in the video frame or the subset of video frames.

The server 201 is configured to generate the metadata by recognizing QR codes, text, and/or URLs within the video frame or the subset of video frames. The server 201 is configured to generate the metadata by performing a vision recognition process on the video frame or the subset of video frames from the at least one video file. In particular, the vision recognition process recognizes commercial products and services within the video frame or the subset of video frames. For example, if the vision recognition process determines the presence of a commercial product, such as a consumer product or motor vehicle, the product is identified and the commercial source of the product is determined. As will be appreciated, the vision recognition process may be based upon an artificial intelligence (AI) vision process with the ability to analyze images, read text, and detect faces with prebuilt image tagging, text extraction with optical character recognition (OCR), and responsible facial recognition, for example, using the Azure AI Vision system, as available from Microsoft Corporation of Redmond, Washington, or Google Lens, as available from the Google LLC of Mountain View, California.

In some embodiments, the metadata may comprise at least one of a link to purchase the at least one item 208 in the video frame from the commercial source, and a coupon for the at least one item in the video frame. Further, the metadata may comprise one or more of a commercial vendor for the at least one item 208, or a class of the at least one item.

In some embodiments, the server 201 may be configured to generate the metadata based upon a plurality of image object classes. In particular, this feature provides an ability to prioritize a certain commercial source for an image class. If the server 201 determines the presence of a motor vehicle in the video frame or the subset of video frames, the server references the image class for motor vehicles and the corresponding priority commercial source for the respective image class. Here, the metadata that will be associated with the motor vehicle will be the corresponding priority commercial source, rather than or in addition to the organic actual source for the recognized item. In this embodiment, third party customers (i.e., commercial sources for the recognized item) can purchase "image class buys", and guarantee that they are presented to the user 210 within the generated metadata. For example, if the recognized motor vehicle is a Honda Accord, but Toyota has purchased the image class for motor vehicles, within the metadata, Toyota will have priority listing, and the organic Honda metadata will either be replaced entirely or given reduced placement. Also, in these embodiments, the image class buys may also be based on other matching criteria besides the image match, such as attributes of the wireless communications device 202. In particular, the current or past geolocation of the wireless communications device 202 or user 210 attributes when combined with the image matching. For example, using the above image class for motor vehicles, the image class may have different priority listings for different geographic regions, such as two car dealers bidding for the same image class for motor vehicles in different geographic regions.

In instances where the one or more items 208 in the video frame or the subset of video frames relate to a commercial advertisement, the organic actual source for the recognized item is the source generating the advertisement. In these instances, the server 201 may omit some of the more computationally intensive vision recognition steps for metadata generation since the advertisement expressly includes the needed metadata.

In instances where the one or more items 208 in the video frame or the subset of video frames relate to a non-advertisement, the organic actual source for the recognized item. Of course, if the image class of the recognized item has a corresponding priority commercial source, the generated metadata will relate to the corresponding priority commercial source, and/or the organic actual source for the recognized item.

In FIGS. 5A-5D, the server 201 is configured to provide an image class management GUI 240 for admin users to monitor bidding and purchasing of desired image classes for priority listing in the video system 200. In FIG. 5A, the image class management GUI 240 illustratively includes an inventory menu showing existing image classes. Each image class includes a status indicator, a number of bids, and an item number. Next to each image class, there is a delete button for deleting the image class, and an edit button for editing the image class. When the edit button is selected, the image class management GUI 240 transitions to an edit menu in FIGS. 5B-5D. The edit menu permits administrative control of each image class for bidding purposes. The associated URL for each prioritized commercial source is editable. Further, the region for each image class is editable so that different regions may have different prioritized commercial sources for the same image class. The call to action activity is also editable. Further, the start and stop date for the advertisement run of the prioritized commercial source for the image class. Also, the edit menu also includes a budget for the class buy. In other words, the vendor user purchasing the prioritized placement can have that enhanced placement up to a certain budget, after which the prioritized placement ends. The server 201 may be configured to provide a GUI to advertisers allowing them to bid on an image class that represents items visually appearing in various entertainment being consumed by an audience.

The server 201 is configured to store the metadata along with the video frame or the subset of video frames, the unique identifier of the at least one video file, and the time stamp. The server 201 is configured to transmit the metadata for the video frame or the subset of video frames to the wireless communications device 202.

In some embodiments, the server 201 may be configured to automatically (i.e., without user input) determine a plurality of advertisements within the at least one video file, and generate inline advertisement metadata for the plurality of advertisements. Here, the server 201 is configured to transmit the inline advertisement metadata to the wireless communications device 202 (either embedded with the at least one video file or perhaps batch downloaded periodically), and the wireless communications device may be configured to render an inline advertisement GUI comprising a chronological listing of the inline advertisement metadata for the plurality of advertisements within the at least one video file. The wireless communications device 202 may be configured to maintain the inline advertisement metadata for the plurality of advertisements within the at least one video file for a set time period. In other words, even if the user 210 does not activate the user input GUI element 213 for recognized one or more items 208 in the at least one video file, the metadata is still generated and periodically transmitted to the wireless communications device 202 for a time windowed period, for example, 1 week. Additionally, the video system 200 may provide extended placement for certain commercial sources who pay for longer placement in the stored metadata.

Further, the wireless communications device 202 may be configured to store activations of the user input GUI element 213 for the at least one video file, and the wireless communications device 202 may be configured to render a favorites GUI for viewing the activations of the user input GUI element for the at least one video file. As will be appreciated, this favorites GUI would be similar to the shopped occurrence GUI 123 in FIGS. 2C-2D.

In some embodiments, the server 201 is configured to extract audio from the video frame or the subset of video frames. The extracted audio is subjected to an audio version of the above described vision recognition algorithms to determine references to the one or more items 208. The server 201 is configured to generate metadata from the one or more items 208 recognized in the extracted audio data.

In some embodiments, the server 201 is configured to store the metadata in the memory 204 for later retrieval for other users. For instance, if another user activates the user input GUI element 213 for a same item already processed by the server 201, the server is configured to pull the metadata from storage rather than regenerate the metadata.

Another aspect is directed to a method of operating a server in a video system 200. The server 201 is configured to store a plurality of video files. The video system 200 includes at least one wireless communications device 202 in communication with the server 201 and configured to render a video playback GUI 211 for at least one video file from the plurality of video files. The video playback GUI 211 includes a video rendering window 212, and a user input GUI element 213 associated the video rendering window. The at least one wireless communications device 202 is configured to when the user input GUI element 213 is activated while the at least one video file is playing, send a unique identifier of the at least one video file, and a time stamp for when the user input GUI element is activated to the server. The method includes operating the server 201 to segment a video frame from the at least one video file temporally adjacent to the time stamp for when the user input GUI element 213 is activated, and operating the server to generate metadata for the video frame. The metadata is associated with a commercial source for at least one item 208 in the video frame. The method also includes operating the server 201 to store the metadata along with the video frame, the unique identifier of the at least one video file, and the time stamp, and operating the server to transmit the metadata for the video frame to the at least one wireless communications device 202.

Figure 6:
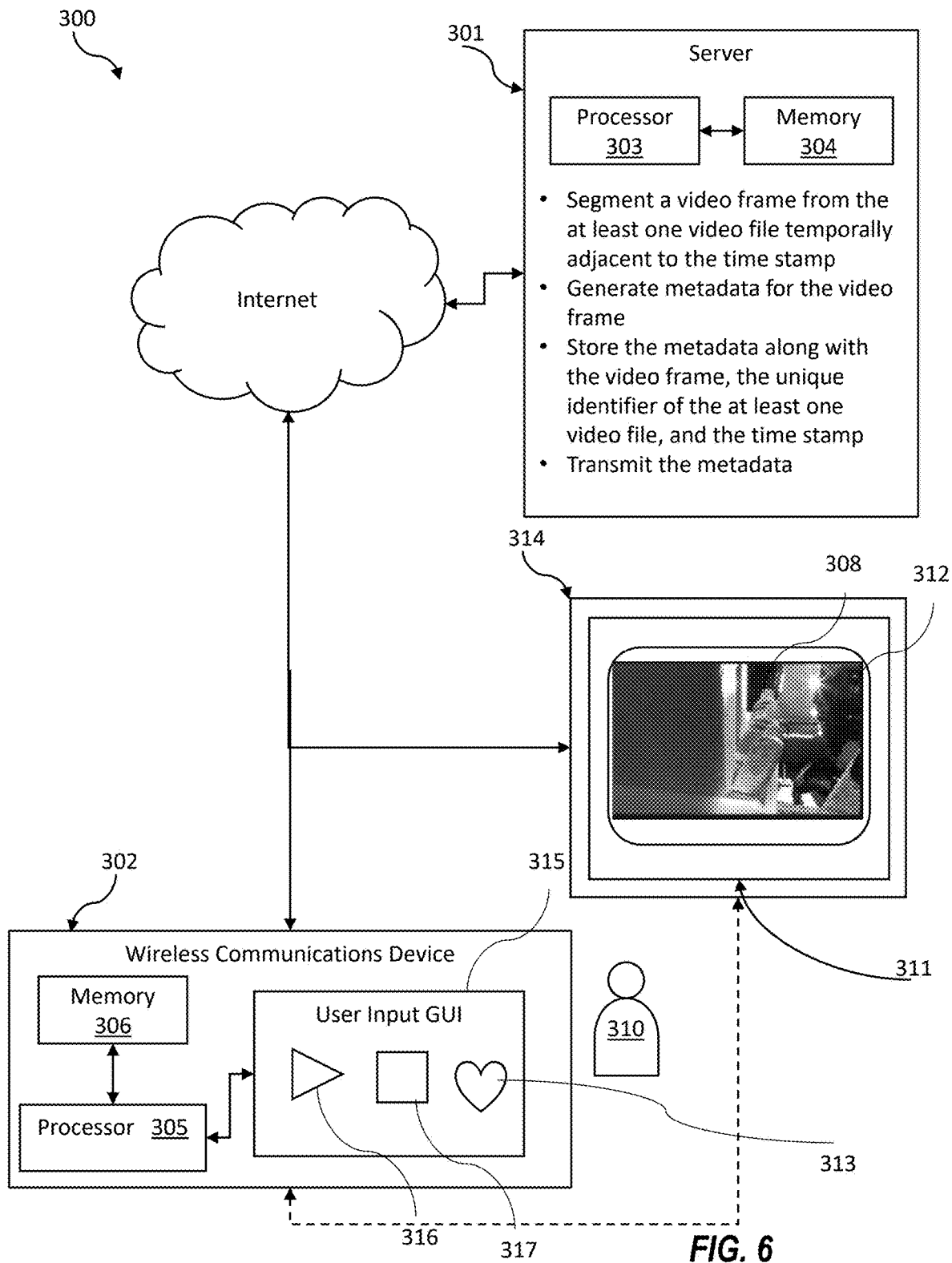
FIG. 6 is a schematic diagram of a third example embodiment of a video system, according to the present disclosure.
Figure 7:
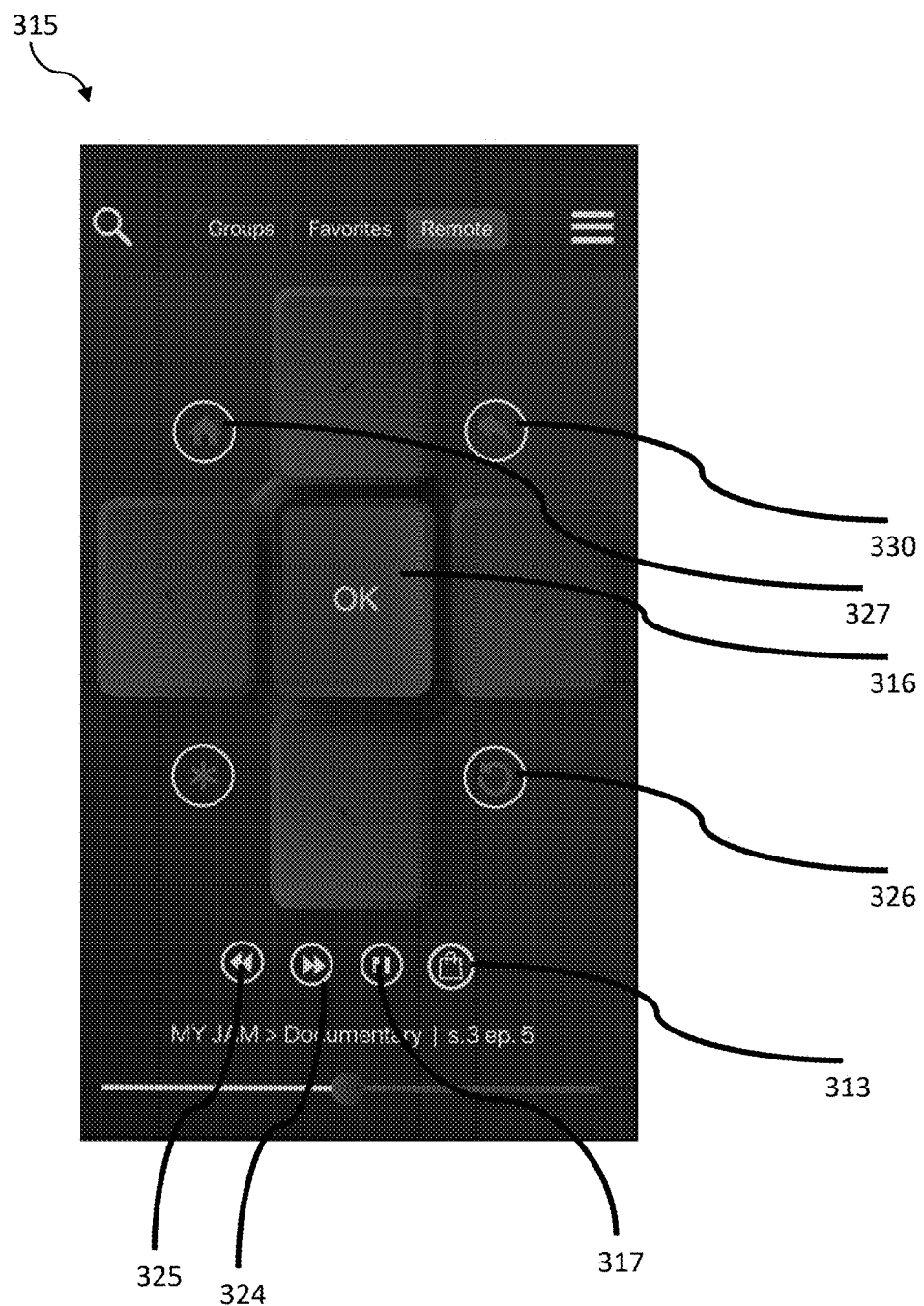
FIG. 7 is a screenshot of an example embodiment of a GUI for the wireless communications device in the video system of FIG. 5.

Referring now additionally to FIGS. 6-7, another embodiment of the video system 300 is now described. In this embodiment of the video system 300, those elements already discussed above with respect to FIGS. 4-5C are incremented by 100 and most require no further discussion herein. This embodiment differs from the previous embodiment in that this video system 300 illustratively includes the wireless communications device comprising a first mobile wireless communications device 302 and a second TV wireless communications device 314 in communication with the first mobile wireless communications device, for example, via the illustrated Internet. Of course, in other embodiments, the first mobile wireless communications device 302 and the second TV wireless communications device 314 are alternatively or additionally directly connected via a local wireless connection, such as WiFi or Bluetooth (noted with the dashed connector line). The second TV wireless communications device 314 is configured to render a video playback GUI 311. The first mobile wireless communications device 302 is configured to render the user input GUI 315. The user input GUI 315 illustratively includes a user input GUI element 313 (e.g., the illustrated shopping icon), a play input GUI element 316, a forward input GUI element 324, a rewind input GUI element 325, a stop input GUI element 317, a replay input GUI element 326, a home navigation input GUI element 327, and a back navigation input GUI element 330.

Helpfully, the video systems 100, 200, 300 may provide an approach to the drawbacks of typical digital advertisements. With typical digital advertisements, the workflow is synchronous. In other words, for the advertisement conversion to happen, the user 110, 210, 310 is taken away from the primary viewing subject (i.e., the at least video file). With the video systems 100, 200, 300, the workflow is asynchronous and permits the user to view the at least video file without disruption to the entertainment.

In the following, the logic steps for an example embodiment of the video systems 100, 200, 300 is now described. 1 A system and a method for video consumption application allowing a user to rate, thumbs up/down, individual ads of videos/shows; wherein 1.1 the video files are imported into system storage; 1.2 the video files are assigned UUID (globally unique identifier) in a database; and wherein 1.2.1 the duration and the run time of the video files are determined and stored in the database referenced by the assigned UUID.

1.3 a chronological playlist for viewing multiple video files in a continuous sequence is created by a system operator or an automated program creator and stored in the database; and wherein 1.3.1 the chronological playlist is used to generate HLS manifest containing the UUID of each video file(s) in the playlist and each video file(s) playback duration and the total cumulative since the relative start time of the chronological playlist started streaming/broadcasting (e.g. the show clock metadata).

1.4 an HLS video player reads the HLS streaming manifest and begins playing the video;

1.5 a viewer is presented with a "SHOP/LIKE Button", wherein 1.5.1 the viewer, on seeing something in the video playback that they are liking or are interested in purchasing, pushes the "Shop/Like" button; 1.6 the video player extracts the show clock data and the UUID; wherein 1.6.1 the video player sends the UUID and show clock data to a remote server that stores the viewer's "Shop/Like Button" request in a database; 1.6.2 a small sample of the video frames/still images is extracted from each of the video file(s) on basis of the viewer's "Shop/Like Button" request; 1.6.3 the extracted video frames/still images is forwarded to a separate image recognition processor(s); and 1.6.4 the metadata returned from the separate image recognition processor(s) is saved in a database.

1.7 the viewer's device displays a user interface (UI) showing a list of all items the viewer either liked or are interested in purchasing; wherein 1.7.1 the viewer selects an item UI showing a list of all items the viewer either liked or is interested in purchasing; 1.7.2 the UI displays the metadata returned from the separate image recognition processor(s) that was saved in a database including Internet URL/Links to the items the viewer liked or are interested in purchasing; and 1.7.3 the viewer follows URL/Links to the items the viewer liked or are interested in purchasing and completes a transaction on the affiliated website.

In the following, the logic steps for an example embodiment of the video systems 100, 200, 300 is now described. 1) The Video file(s) are imported into system storage 2) The Video file(s) are assigned UUID (globally unique identifier) in a database 3) The Video file(s) are analyzed to determine duration and run time and stored in a database referenced by the video file's UUID 4) A system operator or an automated program creates a chronological playlist for viewing multiple Video file(s) in a continuous sequence and stores the playlist in the database 5) The chronological playlist (4) is used to generate an HLS Streaming Manifest containing the UUID, of each Video file(s) in the playlist and each Video file(s) playback duration and the total cumulative during since the relative start time of the chronological playlist (5) started streaming/broadcasting, for example, the show clock metadata.

6) An HLS Video player reads the HLS Streaming Manifest and begins playing the Video. A Viewer is presented with a "Shop/Like Button" as part of the playback UI. 7) The Viewer sees something in the Video playing they like or are interested in purchasing and pushes the "Shop/Like Button". 8) The Video player extracts the show clock data and UUID. The Video player sends the UUID and show clock data to a remote server that stores the Viewer's "Shop/Like Button" request in a Database.

9) The Viewer's "Shop/Like Button" request is used to extract a small sample of the Video Frames/Still Images from each of the Video file(s). 10) The extracted Video Frames/Still Images forwarded to a separate Image Recognition Processor(s) 11) The metadata returned from the separate Image Recognition Processor(s) is saved in a Database 12) The Viewer's device displays a UI showing a list of all items the Viewer either liked or are interested in purchasing.

13) The Viewer selects an item UI showing a list of all items the Viewer either liked or are interested in purchasing. 14) The UI displays the metadata returned from the separate Image Recognition Processor(s) that was saved in a Database that includes Internet URL/Links to the items the Viewer liked or are interested in purchasing. 15) The Viewer can follow URL/Links to the items the Viewer liked or are interested in purchasing and complete a transaction on the affiliated website.

In the following, the logic steps for an example embodiment of the wireless communications device 102, 202, 302 in the video systems 100, 200, 300 is now described. 1. The playback device presents a graphical user interface listing a series of video data streams to view on the playback device corresponding to multiple video data stream sources. 2. The user selects a video data stream to view on the playback device. 3. The playback device requests the video data stream from the appropriate source depending on the video data stream selected to be viewed. 4. The playback device analyzes video data stream and metadata returned from video data stream's source and extracts a set of unique identifiers identifying both the source of the video data stream and each unique video component of the combined video data stream returned from video data stream's source.

5. During playback, the playback device chronologically stores in a tracking database the unique identifiers that were previously extracted identifying the source of the video data stream, time, date, duration of playback, playback device, and playback device location for each unique video component of the combined video data stream viewed on the playback device.

6. During playback the playback device presents a graphical user interface icon that allows the user to store in a tracking database the unique identifier identifying the source of the video data stream, time, date, duration of playback, playback device, and playback device location for the currently displayed unique video component of the combined video data stream viewed on the playback device when the user interface icon is selected.

In the following, the logic steps for another example embodiment of the wireless communications device 102, 202, 302 in the video systems 100, 200, 300 is now described. 1. The Ad shopping device requests from the tracking database the chronologically stored unique identifiers and their related metadata for each of the previously viewed unique video components associated with the user's playback device. 2. The Ad shopping device presents a graphical user interface that chronologically lists the metadata corresponding to each of the previously viewed unique video components associated with the user's playback device. 3. The user selects a graphical user interface element that corresponds to one of the previously viewed unique video components and depending on the contents of the metadata the shopping device responds with an appropriate action: displaying video advertisement, displaying a coupon, connecting to a website, placing a telephone call etc. 4. The Ad shopping device requests from the tracking database the chronologically stored unique identifiers and their related metadata for each of the previously selected unique video components associated with the user's playback device.

5. The Ad shopping device presents a graphical user interface that chronologically lists the metadata corresponding to each of the previously selected unique video components associated with the user's playback device. 6. The user selects a graphical user interface element that corresponds to one of the previously selected unique video components and depending on the contents of the metadata the shopping device responds with an appropriate action such as but not limited to: displaying video advertisement, displaying a coupon, connecting to a website, placing a telephone call etc.

It should be appreciated that the features of each of the video systems 100, 200, 300 and other disclosed embodiments may be combined with each other. Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A video system comprising:
a server configured to store a plurality of video files; and
at least one wireless communications device in communication with the server and configured to
render a video playback graphical user interface (GUI) for at least one video file from the plurality of video files, the video playback GUI comprising a video rendering window, and a user input GUI element associated the video rendering window, and
when the user input GUI element is activated while the at least one video file is playing, send a unique identifier of the at least one video file, and a time stamp for when the user input GUI element is activated to the server;
the server configured to
segment a video frame from the at least one video file temporally adjacent to the time stamp for when the user input GUI element is activated,
generate metadata for the video frame, the metadata being associated with a commercial source for at least one item in the video frame,
store the metadata along with the video frame, the unique identifier of the at least one video file, and the time stamp, and
transmit the metadata for the video frame to the at least one wireless communications device.

2. The video system of claim 1 wherein the server is configured to segment a plurality of video frames from the at least one video file within a time period of the time stamp, and determine a subset of video frames based upon a vision difference process.

3. The video system of claim 1 wherein the server is configured to generate the metadata by performing a vision recognition process on the video frame from the at least one video file.

4. The video system of claim 1 wherein the server is configured to generate the metadata based upon a plurality of image object classes; and wherein at least one of the plurality of image object classes has a respective priority commercial source for a respective image class.

5. The video system of claim 1 wherein the server is configured to determine a plurality of advertisements within the at least one video file, and generate inline advertisement metadata for the plurality of advertisements.

6. The video system of claim 1 wherein the metadata comprises at least one of a link to purchase the at least one item in the video frame from the commercial source, and a coupon for the at least one item in the video frame.

7. The video system of claim 1 wherein the at least one wireless communications device comprises a first mobile wireless communications device and a second TV wireless communications device in communication with the first mobile wireless communications device; wherein the second TV wireless communications device is configured to render the video playback GUI; and wherein the first mobile wireless communications device is configured to render the user input GUI element.

8. The video system of claim 1 wherein the at least one wireless communications device is configured to store activations of the user input GUI element for the at least one video file; and wherein the at least one wireless communications device is configured to render a favorites GUI for viewing the activations of the user input GUI element for the at least one video file.

9. The video system of claim 5 wherein the server is configured to transmit the inline advertisement metadata to the at least one wireless communications device; and wherein the at least one wireless communications device is configured to render an inline advertisement GUI comprising a chronological listing of the inline advertisement metadata for the plurality of advertisements within the at least one video file.

10. The video system of claim 9 wherein the at least one wireless communications device is configured to maintain the inline advertisement metadata for the plurality of advertisements within the at least one video file for a set time period.

11. A video system comprising:
a server configured to store a plurality of video files; and
at least one wireless communications device in communication with the server and configured to
render a video playback graphical user interface (GUI) for at least one video file from the plurality of video files, the video playback GUI comprising a video rendering window, and a user input GUI element associated the video rendering window, and
when the user input GUI element is activated while the at least one video file is playing, send a unique identifier of the at least one video file, and a time stamp for when the user input GUI element is activated to the server;
the server configured to
segment a plurality of video frames from the at least one video file within a time period of the time stamp, and determine a subset of video frames based upon a vision difference process
generate metadata for the subset of video frames based upon a plurality of image object classes, the generating of the metadata comprises
performing a vision recognition process on the subset of video frames from the at least one video file, at least one of the plurality of image object classes having a respective priority commercial source for a respective image class,
the metadata being associated with a commercial source for at least one item in the subset of video frames,
store the metadata along with the subset of video frames, the unique identifier of the at least one video file, and the time stamp, and
transmit the metadata for the subset of video frames to the at least one wireless communications device.

12. The video system of claim 11 wherein the server is configured to determine a plurality of advertisements within the at least one video file, and generate inline advertisement metadata for the plurality of advertisements.

13. The video system of claim 11 wherein the metadata comprises at least one of a link to purchase the at least one item in the subset of video frames from the commercial source, and a coupon for the at least one item in the subset of video frames.

14. The video system of claim 11 wherein the at least one wireless communications device comprises a first mobile wireless communications device and a second TV wireless communications device in communication with the first mobile wireless communications device; wherein the second TV wireless communications device is configured to render the video playback GUI; and wherein the first mobile wireless communications device is configured to render the user input GUI element.

15. The video system of claim 11 wherein the at least one wireless communications device is configured to store activations of the user input GUI element for the at least one video file; and wherein the at least one wireless communications device is configured to render a favorites GUI for viewing the activations of the user input GUI element for the at least one video file.

16. The video system of claim 12 wherein the server is configured to transmit the inline advertisement metadata to the at least one wireless communications device; and wherein the at least one wireless communications device is configured to render an inline advertisement GUI comprising a chronological listing of the inline advertisement metadata for the plurality of advertisements within the at least one video file.

17. The video system of claim 16 wherein the at least one wireless communications device is configured to maintain the inline advertisement metadata for the plurality of advertisements within the at least one video file for a set time period.

18. A server in a video system, the video system comprising at least one wireless communications device in communication with the server and configured to render a video playback graphical user interface (GUI) for at least one video file from a plurality of video files, the video playback GUI comprising a video rendering window, and a user input GUI element associated the video rendering window, and when the user input GUI element is activated while the at least one video file is playing, send a unique identifier of the at least one video file, and a time stamp for when the user input GUI element is activated to the server, the server comprising:
a processor and memory coupled thereto configured to
segment a video frame from the at least one video file temporally adjacent to the time stamp for when the user input GUI element is activated,
generate metadata for the video frame, the metadata being associated with a commercial source for at least one item in the video frame,
store the metadata along with the video frame, the unique identifier of the at least one video file, and the time stamp, and
transmit the metadata for the video frame to the at least one wireless communications device.

19. The server of claim 18 wherein the processor is configured to segment a plurality of video frames from the at least one video file within a time period of the time stamp, and determine a subset of video frames based upon a vision difference process.

20. The server of claim 18 wherein the processor is configured to generate the metadata by performing a vision recognition process on the video frame from the at least one video file.

21. A method of operating a server in a video system, the server configured to store a plurality of video files, the video system comprising at least one wireless communications device in communication with the server and configured to render a video playback graphical user interface (GUI) for at least one video file from the plurality of video files, the video playback GUI comprising a video rendering window, and a user input GUI element associated the video rendering window, and when the user input GUI element is activated while the at least one video file is playing, send a unique identifier of the at least one video file, and a time stamp for when the user input GUI element is activated to the server, the method comprising:
operating the server to segment a video frame from the at least one video file temporally adjacent to the time stamp for when the user input GUI element is activated;

operating the server to generate metadata for the video frame, the metadata being associated with a commercial source for at least one item in the video frame;

operating the server to store the metadata along with the video frame, the unique identifier of the at least one video file, and the time stamp; and operating the server to transmit the metadata for the video frame to the at least one wireless communications device.

22. The method of claim 21 further comprising operating the server to segment a plurality of video frames from the at least one video file within a time period of the time stamp, and determine a subset of video frames based upon a vision difference process.

23. The method of claim 21 further comprising operating the server to generate the metadata by performing a vision recognition process on the video frame from the at least one video file.

\* \* \* \* \*